(12) United States Patent
Dupont

(10) Patent No.: US 10,264,204 B2
(45) Date of Patent: Apr. 16, 2019

(54) IMAGE SENSOR

(71) Applicant: Commissariat à l'Energie Atomique et aux Energies Alternatives, Paris (FR)

(72) Inventor: Bertrand Dupont, Sassenage (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 15/937,760

(22) Filed: Mar. 27, 2018

(65) Prior Publication Data

US 2018/0288350 A1 Oct. 4, 2018

(30) Foreign Application Priority Data

Mar. 28, 2017 (FR) ...................... 17 52583

(51) Int. Cl.
*H04N 5/3745* (2011.01)
*H04N 5/355* (2011.01)
*H04N 5/378* (2011.01)
*H04N 5/363* (2011.01)
*H04N 5/347* (2011.01)

(52) U.S. Cl.
CPC .............. *H04N 5/378* (2013.01); *H04N 5/347* (2013.01); *H04N 5/3559* (2013.01); *H04N 5/35536* (2013.01); *H04N 5/363* (2013.01); *H04N 5/37452* (2013.01); *H04N 5/37457* (2013.01)

(58) Field of Classification Search
None
See application file for complete search history.

(56) References Cited

U.S. PATENT DOCUMENTS

| 9,100,597 | B2* | 8/2015 | Hu ......................... H04N 5/347 |
| 2012/0154597 | A1 | 6/2012 | Wilson et al. |
| 2013/0141620 | A1 | 6/2013 | Nakajima |
| 2015/0146060 | A1 | 5/2015 | Suzuki et al. |

OTHER PUBLICATIONS

Preliminary Search Report for French Patent Application No. 1752583 dated Oct. 27, 2017, 2 pages.

* cited by examiner

*Primary Examiner* — Mark T Monk
(74) *Attorney, Agent, or Firm* — Moreno IP Law LLC

(57) ABSTRACT

The invention concerns an image sensor including a plurality of pixels distributed in a plurality of elementary groups of a plurality of pixels each, wherein: each pixel includes a photoelectric conversion element and an individual capacitive storage element; and each elementary group of pixels includes a shared capacitive storage element.

16 Claims, 7 Drawing Sheets

IMAGE SENSOR

CROSS-REFERENCE TO RELATED APPLICATION

This application claims the priority benefit of French patent application number 17/52583, the content of which is hereby incorporated by reference in its entirety to the maximum extent allowable by law.

FIELD

The present disclosure generally relates to the field of electronic circuits, and more specifically aims at the field of image sensors. The described embodiments are particularly advantageous for infrared imaging applications, but may more generally apply to any types of image sensors, particularly visible image sensors.

BACKGROUND

An image sensor conventionally comprises a plurality of identical or similar pixels, for example arranged in an array of rows and columns. Each pixel comprises a photoelectric conversion element, for example, a photodiode, capable of generating a photocurrent representative of a received light intensity. Each pixel, further comprises a capacitive storage element capable of integrating the photocurrent generated by the photoelectric conversion element. The measurement of the illumination level received by the pixel is performed by measuring a voltage variation across the capacitive storage element between the beginning and the end of an integration phase.

To maximize the signal-to-noise ratio, it is generally desired for the light flow converted by the photoelectric conversion element of the pixel during the integration period to be as high as possible, or, in other words, for the quantity of photogenerated charges stored in the capacitive storage element of the pixel during the integration period to be as high as possible. This implies for the capacitive element to have a relatively significant charge storage capacity, which goes against the usual search for pixel miniaturization, and particularly for a reduction of the pitch between pixels.

SUMMARY

Thus, an embodiment provides an image sensor comprising a plurality of pixels distributed in a plurality of elementary groups of a plurality of pixels each, wherein:

each pixel comprises a photoelectric conversion element and an individual capacitive storage element; and each elementary group of pixels comprises a shared capacitive storage element, the sensor further comprising a control circuit capable, during a current image acquisition phase, of implementing, in each elementary group of pixels, the steps of:

a) during a first integration sub-period, coupling the photoelectric conversion elements of the pixels of the group to the shared capacitive storage element, to integrate a current representative of the sum of the photocurrents generated by the photoelectric conversion elements of the pixels of the group, and coupling the individual capacitive storage elements of the pixels of the group to the shared capacitive storage element to distribute the photogenerated charges between the shared capacitive storage element and the individual capacitive storage elements; and b) during a second integration sub-period folio wing the first integration sub-period, in each pixel of the group, isolating the individual capacitive storage element of the pixel from the shared capacitive storage element and coupling the photoelectric conversion element of the pixel to the individual capacitive storage element of the pixel to integrate in the individual capacitive storage element of the pixel a entreat representative of the photocurrent generated by the photoelectric conversion element of the pixel.

According to an embodiment, the control circuit is capable, at step a), of implementing the successive steps of:

a1) during a first part of the first integration sub-period, coupling the photoelectric conversion elements of the pixels of the group to the shared capacitive storage element and isolating, in each pixel of the group, the individual capacitive storage element of the pixel from the shared capacitive storage element, to integrate, in the shared capacitive storage element only, a current representative of the sum of the photocurrents generated by the photoelectric conversion elements of the pixels of the group; and a2) during a second part of the first integration sub-period, coupling the individual capacitive storage elements of the pixels of the group to the shared capacitive storage element to distribute between the shared capacitive storage element and the individual capacitive storage elements the charges photogenerated by the photoelectric conversion elements of the pixels of the group during the first integration sub-period.

According to an embodiment, the control circuit is further capable of, in each pixel of the group, during the first part of the first integration sub-period, reading a value representative of the voltage level of the individual capacitive storage element of the pixel, corresponding to an output value of a previous acquisition phase.

According to an embodiment, the control circuit is further configured to, in each pixel of the group, during the first part of the first integration sub-period and after the reading of the output value of the previous acquisition phase, reset the individual capacitive storage element of the pixel.

According to an embodiment, the control circuit is capable of, at step a), coupling the individual capacitive storage elements of the pixels of the group to the shared capacitive storage element during the entire first integration sub-period.

According to an embodiment, the control circuit is further configured to, from each pixel of the group, at the end of the second integration sub-period, read a value representative of the voltage level of the individual capacitive storage element of the pixel, corresponding to an output value of the current acquisition phase.

According to an embodiment, the control circuit is further configured to read a value representative of the voltage level of the shared capacitive storage element at the end of the first integration sub-period.

According to an embodiment, the sensor further comprises a processing circuit capable of determining, for each pixel of the group, a final output value by taking into account the output values of the current acquisition phase of all the pixels of the group.

According to an embodiment, the final output value of each pixel is a weighted sum of the output values of the current acquisition phase of all the pixels of the group.

According to an embodiment:

each pixel comprises a photodiode supplying a photocurrent on a first node of the pixel, and a sampling transistor coupling the first node to the individual capacitive storage element of the pixel; and each elementary group of pixels comprises a set of control transistors coupling the first node of each pixel of the group to the shared capacitive storage element of the group.

According to an embodiment, each pixel further comprises an additional individual capacitive storage element connected to the first node.

According to an embodiment, the control circuit is capable of setting a first time of switching between the first and second parts of the first integration period and a second time of switching between the first and second integration periods according to an average luminosity level received by the sensor.

According to an embodiment, the setting of the first and second switching times is generally performed for all the elementary groups of pixels of the sensor.

According to an embodiment, the setting of the first and second switching times is performed individually in each elementary group of pixels of the sensor.

According to another embodiment, each elementary pixel group comprises a local setting circuit capable of monitoring the variation of the voltage across the shared capacitive storage element during a setting phase at the beginning of the first integration sub-period, and of setting the first and second switching times according to the observed variation of the voltage across the shared capacitive storage element during the setting phase.

According to an embodiment, the setting of the first and second switching times is performed by taking into account a luminosity level measured during one or a plurality of previous acquisition phases.

The foregoing and other features and advantages will be discussed in detail in the following non-limiting description of specific embodiments in connection with the accompanying drawings.

DETAILED DESCRIPTION OF THE PRESENT EMBODIMENTS

Figure 1:
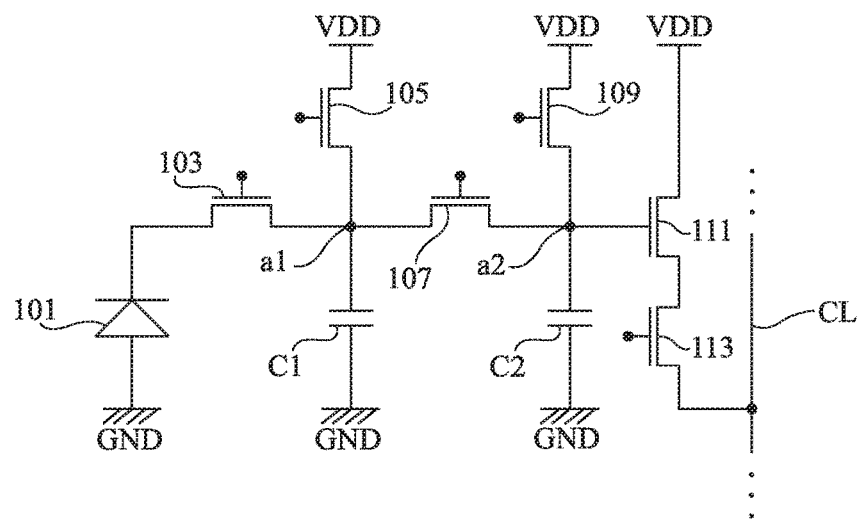
FIG. 1 is a partial electric diagram of a first example of an image sensor.

The same elements have been designated with the same reference numerals in the different drawings. For clarity, only those steps and elements which are useful to the understanding of the described embodiments have been shown and are detailed. In particular, the peripheral circuits for controlling and reading from the described image sensors have not been detailed, the forming of such circuits being within the abilities of those skilled in the art based on the indications of the present description. The terms "approximately", "substantially", and "in the order of" are used herein to designate a tolerance of plus or minus 10%, preferably of plus or minus 5%, of the value in question. In the present description, term "connected" is used to designate a direct electric connection, with no intermediate electronic component, for example, by means of one or a plurality of conductive tracks, and term "coupled" or term "linked" is used to designate either a direct electric connection (then meaning "connected") or a connection via one or a plurality of intermediate components (resistor, diode, capacitor, etc.).

FIG. 1 is a partial electric diagram of an example of an image sensor. In FIG. 1, only one pixel of the sensor has been shown.

The pixel of FIG. 1 is compatible with a global shutter operating mode of IWR ("Integrate While Read") type. It comprises:

a photodiode 101 having its anode coupled to a node GND of application of a low reference potential or ground, an injection transistor 103 having a first conduction node connected to the cathode of photodiode 101 and having a second conduction node connected to a first intermediate node a1;

a first capacitive charge storage element C1, for example, a capacitor, having a first electrode connected to node a1 and a second electrode coupled to node GND;

a first reset transistor 105 having a first conduction node connected to node a1 and having a second conduction node coupled to a node VDD of application of a high reference potential (that is, higher than the potential of node GND) of the pixel, for example, a node of application of a high power supply potential of the sensor;

a sampling transistor 107 having a first conduction node connected to node a1 and having a second conduction node connected to a second intermediate node a2;

a second capacitive charge storage element C2, for example, a capacitor, having a first electrode connected to node a2 and a second electrode coupled to node GND;

a second reset transistor 109 having a first conduction node connected to node a2 and having a second conduction node coupled to node VDD;

a readout transistor 111 having a control node connected to node a2 and having a first conduction node coupled to node VDD; and a selection transistor 113 having a first conduction node coupled to a second conduction node of transistor 111 and having a second conduction node coupled to an output conductive track CL of the pixel.

In this example, transistors 103, 105, 107, 109, 111, and 113 are N-channel MOS transistors.

In operation, the gate of injection transistor 103 is biased, via a feedback circuit, not shown, to maintain the cathode of photodiode 101 at a substantially constant potential. As a variation, a constant potential is applied to the gate of transistor 103, which enables to maintain an approximately constant potential on the cathode of photodiode 101. Photodiode 101 and transistor 103 thus define a photoelectric conversion element capable of supplying on node a1 a photocurrent representative of a light intensity received by the photodiode.

Transistors 105, 107, 109, and 113 are control transistors, for example, controlled in switched mode, for example, via binary control signals applied to their respective gates.

Transistor 111 is assembled as a follower source, that is, its gate is connected, to node a2, its drain is coupled to node VDD, and its source is connected to the drain of transistor 113. In operation, transistor 111 supplies on its source a potential representative of the potential of node a1. This potential is transferred onto output track CL of the pixel via selection transistor 113 when the latter is in the on (conductive) state.

The sensor of FIG. 1 may comprise a plurality of pixels of the above-described type, arranged in an array of rows and columns. As an example, in each column of the array, the column pixels share a same output conductive track CL, the pixels of different columns being connected to different output conductive tracks CL. The array pixels are for example simultaneously controllable row by row, that is, in each row of the array, the transistors 105, respectively 107, respectively 109, respectively 113 of the pixels of the tow have their control gates connected to a same first reset control conductive track, respectively to a same sampling control conductive track, respectively to a same reset control conductive track, respectively to a same selection control conductive track. The control gates of the transistors 105, respectively 107, respectively 113 of the pixels of different rows are for example connected to different control conductive tracks.

An example of operation of the sensor of FIG. 1 during an image acquisition phase will now be described. The control method described hereafter may be implemented by peripheral sensor control and readout circuits, not shown.

An initial state where, in each sensor pixel, sampling transistor 107 and reset transistor 109 are maintained in the off (non-conductive) state to isolate from the rest of the pixel capacitive storage element C2, where information representative of the illumination level received by the pixel during a previous integration is stored, is considered.

In a first step, the reset transistors 105 of all the sensor pixels are turned on, for example, simultaneously, to reset the capacitive storage element C1 of each pixel to a predetermined voltage level, for example, close to the potential of node VDD. It should be noted that in this example, transistor 105 is an N-channel MOS transistor. The potential applied to node a1 is thus substantially equal to $MIN(VDD; VG_{105}-Vth_{105})$, where $VG_{105}$ is the voltage applied to the gate of transistor 105 and $Vth_{105}$ is the threshold voltage of transistor 105. As an example, it is provided to apply to the gate of transistor 105 a potential $VG_{105}$ greater than or equal to $VDDH+Vth_{105}$, to reset capacitive element C1 to a voltage level substantially equal to potential VDD.

Reset transistors 105 are then simultaneously turned back off in all the sensor pixels, which marks the beginning of a period of simultaneous integration of all the sensor pixels.

During the integration period, the voltage levels of capacitive storage elements C2 of the sensor pixels, representative of the illumination levels received by the pixels during the previous integration period, are successively read, row by row. To achieve this, the selection transistors 113 of the pixels of a first row of the sensor are first simultaneously turned on while the selection transistors 113 of the pixels of the other rows of the sensor are kept off. Thus, in each pixel of the selected row, a potential representative of the voltage level of capacitive element C2 of the pixel is transferred onto output conductive track CL of the pixel. The voltage levels of the output conductive tracks CL of the sensor are then read and stored by the peripheral sensor control and readout circuits. The read sequence is then repeated by selecting a new row of the sensor, and so on until all the rows have been read.

In each pixel of the sensor, after the reading of the voltage level of capacitive element C2 element C2 is reset to a predetermined voltage level, for example, close to the potential of node VDD, by the turning on and then the turning back off of transistor 109. As previously explained, transistor 109 being, in this example, an N-channel MOS transistor, the potential applied to node a2 is substantially equal to $MIN(VDD; VG_{109}-Vth_{109})$, where $VG_{109}$ is the voltage applied to the gate of transistor 109 and $Vth_{109}$ is the threshold voltage of transistor 109. As an example, it is provided to apply to the gate of transistor 109 a potential $VG_{109}$ greater than or equal to $VDD+Vth_{109}$, to reset capacitive element C2 to a voltage level substantially equal to potential VDD.

This step of resetting capacitive element C2 may be earned out simultaneously for all the sensor pixels, after the reading of the last pixel row of the sensor, or sequentially, as the rows are being read from.

After the reading and the resetting of the capacitive storage elements C2 of all the sensor pixels, the sampling transistors 107 are simultaneously turned on in all the sensor pixels. In each pixel, the photogenerated charges stored in capacitive element C1 from the beginning of the integration period are then shared between capacitive elements C1 and C2.

After a turn-on period forming part of the integration period, sampling transistors 107 are simultaneously turned back off in all the sensor pixels. This marks the end of the sensor integration period. At this stage, in each pixel of the sensor, capacitive storage element C2 stores a voltage level representative of the illumination level received by the pixel photodiode during the integration period.

The method then resumes from the first step to implement a new integration period of the sensor and simultaneously read the image stored in capacitive elements C2.

Figure 2:
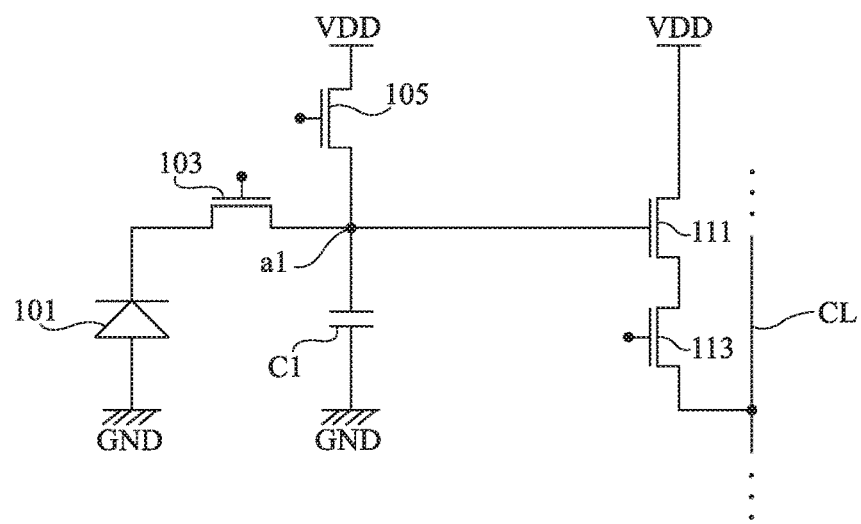
FIG. 2 is a partial electric diagram of a second example of an image sensor.

FIG. 2 is a partial electric diagram of an example of an image sensor. As in the example of FIG. 1, only one pixel of the sensor has been shown in FIG. 2.

The sensor of FIG. 2 differs from the sensor of FIG. 1 essentially in that, in the sensor of FIG. 2, the pixels do not comprise sampling transistor 107, capacitive element C2, and transistor 109 for resetting capacitive element C2. More particularly, in the pixels of the sensor of FIG. 2, node a1 is directly connected to the gate of readout transistor 111.

The sensor of FIG. 2 is compatible with a rolling shutter embodiment of ITR ("Integrate Then Read") type.

An example of operation of the sensor of FIG. 2 during an image acquisition phase will now be described. In this example, the pixels of a same sensor row are simultaneously controlled according to a same control sequence, and the different rows of the sensor are successively controlled, according to identical or similar control sequences, with a time shift between two successive rows at least equal to the duration of a pixel row read phase. Only the control sequence of a single pixel of the sensor is described hereafter.

In a first step, transistor 105 of the pixel is turned on to reset capacitive storage element C1 of the pixel to a voltage level close to the potential of node VDD.

Reset transistor 105 is then turned back off, which marks the beginning of an integration period of the pixel, during which the voltage of capacitive element C1 decreases according to the illumination level received by photodiode 101 of the pixel.

At the end of the integration period, a phase of reading the voltage level of capacitive storage element C1 is implemented. To achieve this, selection transistor 113 of the pixel is first turned on. Thus, a potential representative of the voltage level of capacitive element C1 of the pixel is transferred onto output conductive track CL of the pixel. The voltage level of output conductive track CL of the pixel is then read and stored by the peripheral sensor control and readout circuits, after which the selection transistor 113 of the pixel is turned back off.

The method can then resume from the first step to implement a new phase of acquisition of an output value of the pixel.

In the examples of FIGS. 1 and 2, the sensor pixels are of active type, that is, they comprise a readout transistor 111 assembled as an amplifier between capacitive read node a2 (FIG. 1) or a1 (FIG. 2) of the pixel and output conductive track CL of the pixel. A reset transistor 109 (FIG. 1) or 105 (FIG. 2) is further provided to reset the capacitive readout element C2 (FIG. 1) or C1 (FIG. 2) of the pixel.

Figure 3:
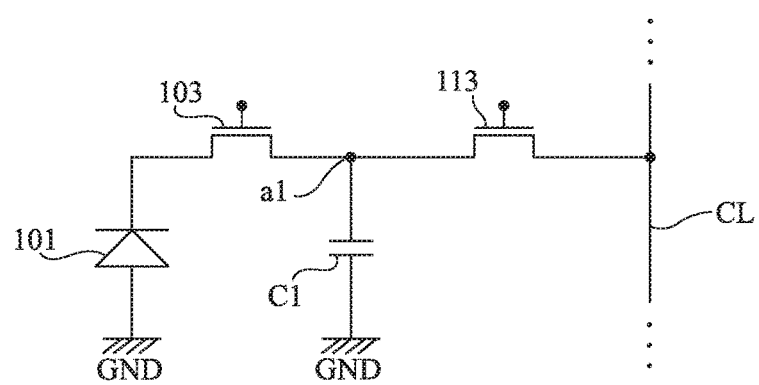
FIG. 3 is a partial electric diagram of a third example of an image sensor.

FIG. 3 is a partial electric diagram of another ex-ample of an image sensor. As in the example of FIGS. 1 and 2, only one pixel of the sensor has been shown in FIG. 3.

The pixels of the sensor of FIG. 3 are of passive type, that is, they comprise no amplifier internal to the pixel.

The sensor of FIG. 3 differs from the sensor of FIG. 2 essentially in that, in the sensor of FIG. 3, the pixels do not comprise reset transistor 105 and readout amplification transistor 111. More particularly, in the pixels of tire sensor of FIG. 3, selection transistor 113 has a first conduction node connected to node a1 and a second conduction node connected to conductive track CL.

The sensor of FIG. 3 is compatible with a rolling shutter embodiment of ITR ("Integrate Then Read") type.

The operation of the sensor of FIG. 3 may be identical to that of the sensor of FIG. 2, to within the difference that, in the sensor of FIG. 3, the resetting of capacitive element C1 is automatically performed during the reading from the pixel. More particularly, when selection transistor 113 is on, the photogenerated charges contained in capacitive element C1 are transferred onto output conductive track CL of the pixel. The virtual ground of an amplifier (not shown) connected to track CL is then imposed on node a1, which results in resetting capacitive element C1. The pixel integration period starts at the turning back off of selection transistor 113.

As a variation, an image sensor may comprise passive pixels compatible with an IWR-type operation. For this purpose, the pixels of FIG. 1 may for example be modified by suppressing transistors 109 and 111 and by connecting the conduction nodes of selection transistor 113 respectively to node a2 and to output conductive track CL.

As previously indicated, to maximize the signal-to-noise ratio for a strong flow, it is generally desired for the light flow converted by the photoelectric conversion element of the pixel during the integration period to be as high as possible. In the above-mentioned examples, this implies for capacitive element C1 of the pixel to have a relatively high charge storage capacity, and thus a relatively large bulk.

Figure 4:
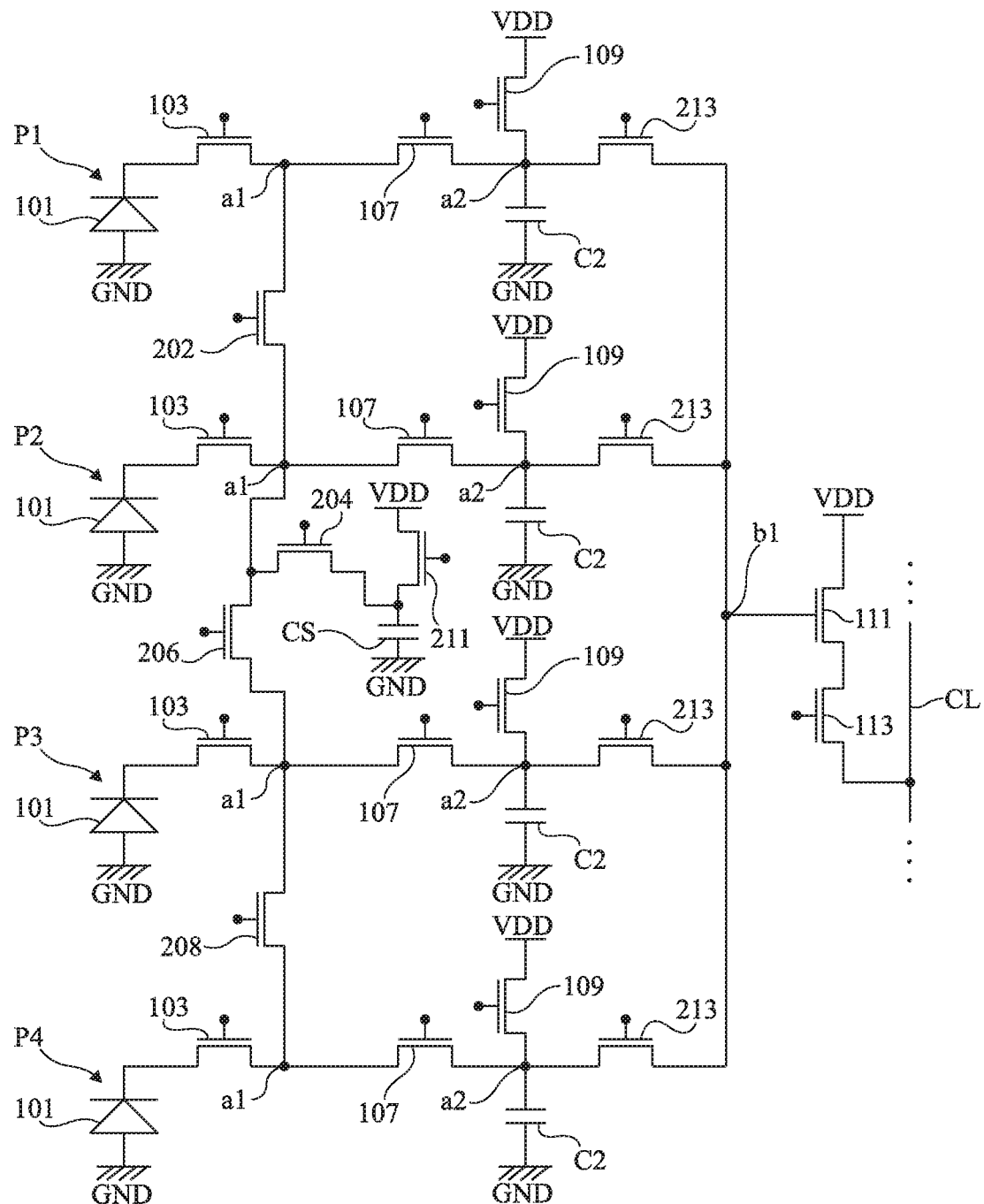
FIG. 4 is a partial electric diagram of a first example of an image sensor according to an embodiment.

FIG. 4 is a partial electric diagram of an example of an image sensor according to an embodiment. The sensor of FIG. 4 comprises a plurality of pixels distributed in a plurality of elementary groups (identical or similar) of a plurality of neighboring pixels.

In FIG. 4, only one elementary group of four neigh-boring pixels has been shown. In practice, the number of neighboring pixels. In each elementary group of the sensor may be different from four. As an example, the number of neighboring pixels in each elementary group is in the range from 2 to 16.

The pixels of the sensor of FIG. 4 are for example arranged in an array along rows and columns, according to a layout similar to that which has been previously described in relation with FIG. 1.

In the example of FIG. 4, each elementary group of the sensor is formed of four consecutive pixels of a same pixel column of the sensor. The described embodiments are however not limited to this specific case. It will be within the abilities of those skilled in the art to adapt the described embodiments to other layouts of the pixels in each elementary group. As an example, each elementary group may be formed of neighboring pixels of a same row, or of a sub-array of a plurality of rows and a plurality of columns of neighboring pixels.

The pixels of the sensor of FIG. 4 comprise elements common with the pixels of the sensor of FIG. 1. The common elements will not be described again in detail. In the rest of the description, only the differences with respect to the sensor of FIG. 1 will be highlighted.

As in the example of FIG. 1, each pixel comprises a photodiode 101 having its anode coupled to a node GND of application of a low reference potential or ground, an injection transistor 103 coupling the cathode of photodiode 101 to a first intermediate node a1, a sampling transistor 107 coupling node a1 to a second intermediate node a2, a capacitive charge storage element C2 between node a2 and node GND, and a reset transistor 109 connecting node a2 to a node VDD of application of a high reference potential of the pixel.

The pixels of the sensor of FIG. 4 differ from the pixels of the sensor of FIG. 1 in that they do not comprise capacitive storage element C1 and reset transistor 105.

In the sensor of FIG. 4, each elementary group of pixels comprises a capacitive storage element CS, for example, a capacitor, shared by all the pixels in the group. Capacitive storage element CS replaces the individual capacitive storage elements C1 of the pixels of the sensor of FIG. 1.

Advantageously, for an identical pitch between pixels, the capacitance of shared element CS of the sensor of FIG. 4 may be greater than four times the capacitance of an individual element C1 of the sensor of FIG. 1. Indeed, by sharing a capacitive element CS between a plurality of neighboring pixels of the sensor, surface area losses due to the guard distances between capacitors, which should be respected in an architecture of the type described in relation with FIG. 1, are decreased.

Further, due to its larger dimensions, shared capacitive element CS of the sensor of FIG. 4 is easier to form than the individual capacitive elements C1 of the sensor of FIG. 1, particularly when the pitch between sensor pixels is small. In particular, the relatively large dimensions of shared capacitive storage element CS may provide access to manufacturing technologies which are not available in architectures of the type described in relation with FIG. 1 due to the too small dimensions of individual capacitive storage elements C1. In a preferred embodiment, the shared capacitive element CS of the sensor of FIG. 4 is a MIM-type (metal-insulator-metal) capacitor, arranged above the transistors of the pixels of the group, which provides a significant gain of surface area.

Each elementary group of pixels of the sensor of FIG. 4 further comprises a set of control transistors enabling to simultaneously couple the nodes a1 of all the pixels in the group to shared capacitive element CS, or to isolate the nodes a1 of the pixels in the group from element CS.

Figure 5:
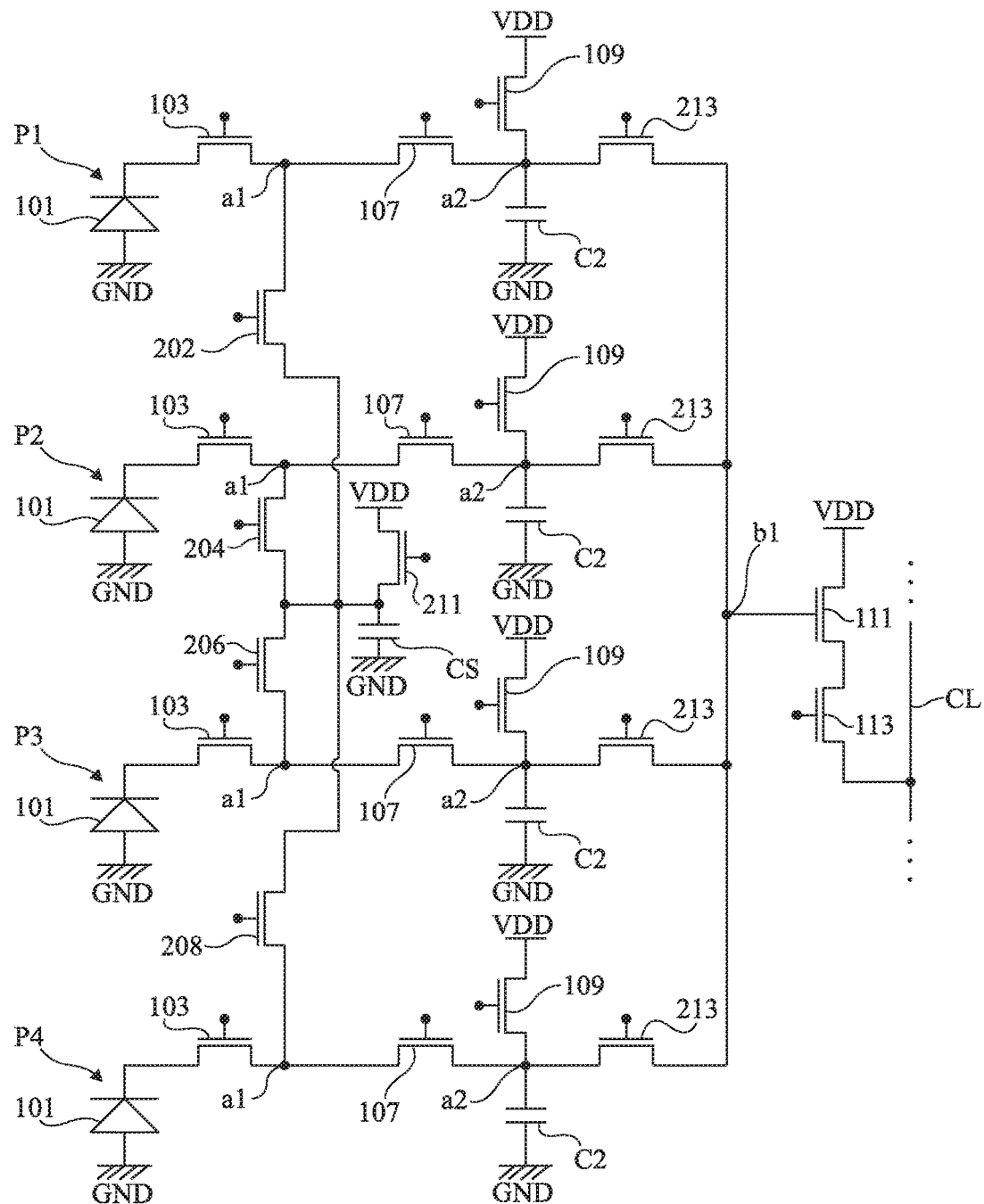
FIG. 5 is a partial electric diagram of a second embodiment of an image sensor according to an embodiment.
Figure 6:
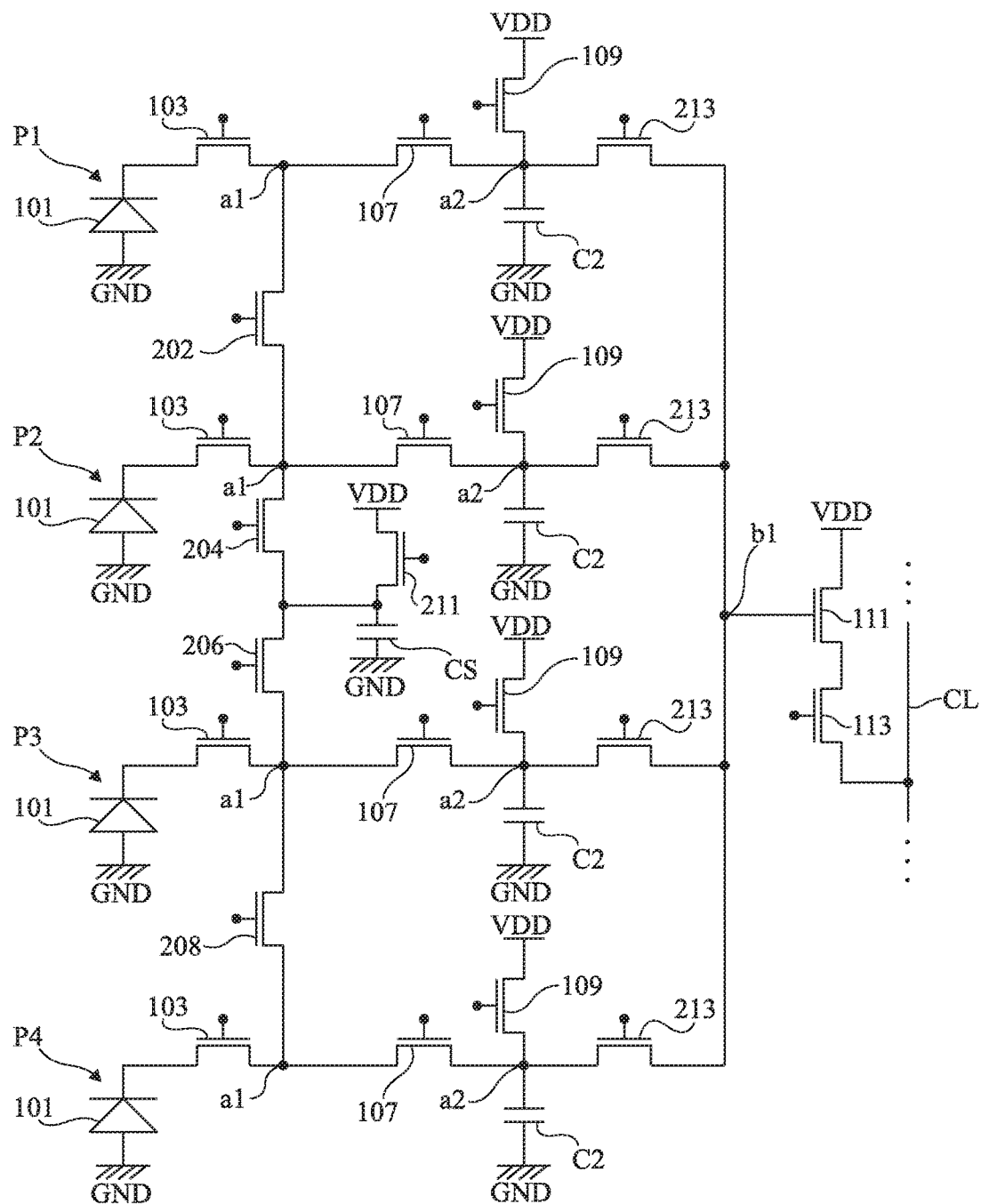
FIG. 6 is a partial electric diagram of a third example of an image sensor according to an embodiment.

More particularly, in the shown example, each group of pixels comprises a set of four control transistors 202, 204, 206, and 208. The four consecutive pixels of an elementary group of sensor pixels are respectively designated, with references P1, P2, P3, and P4. Transistor 202 has a first conduction node connected to node a1 of pixel P1 and a second conduction node connected to node a1 of pixel P2. Transistor 204 has a first conduction node connected to node a1 of pixel P2 and a second conduction node connected to a first electrode of capacitive element CS. Transistor 206 has a first conduction node connected to node a1 of pixel P2 and a second conduction node connected to node a1 of pixel P3. Transistor 208 has a first conduction node connected to node a1 of pixel P3 and a second conduction node connected to node a1 of pixel P4. In this example, the second electrode of capacitive element CS is coupled to node GND. When transistors 202, 204, 206, and 208 are on, the nodes a1 of the four pixels in the group are coupled to one another and to the first electrode of element CS. When transistors 202, 204, 206, and 208 are off, the nodes a1 of the four pixels in the group are isolated from one another and isolated from the first electrode of element CS. It should be noted that other layouts of transistors 202, 204, 206, and 208 may be provided to obtain these two operating configurations. For example, transistors 202, 204, 206, and 208 may directly couple nodes a1 of pixels P1, P2, P3, and P4, respectively, to the first electrode of capacitive element CS (star connection). Such a configuration is shown in FIG. 5. As a variation, transistor 202 couples node a1 of pixel P1 to node a1 of pixel P2, transistor 204 couples node a1 of pixel P2 to the first electrode of element CS, transistor 206 couples node a1 of pixel P3 to the first electrode of element CS, and transistor 208 couples node a1 of pixel P4 to node a1 of pixel P3. Such a configuration is shown in FIG. 6.

Each elementary group of pixels of the sensor of FIG. 4 further comprises a transistor 211 for resetting shared capacitive element CS, having a first conduction node connected to the first electrode of element CS, and having a second conduction node coupled to node VDD.

In the example of FIG. 4, the selection and readout circuit formed by transistors 111 and 113 is mutualized between the pixels of a same elementary group. More particularly, in the example of FIG. 4, each pixel comprises an additional selection transistor 213 having a first conduction node connected to node a2 of the pixel and having a second conduction node connected to a node b1 common to a1 the pixels in the group. Readout transistor 111, common to all the pixels in the group, has its gate connected to node b1. As in the example of FIG. 1, transistor 111 has a first conduction node coupled to node VDD, and selection transistor 113 (also common to all the pixels in the group) has a first conduction node coupled to a second conduction node of transistor 111 and a second conduction node coupled to an output conductive track CL of the group. Thus, in this example, within each elementary group, the different pixels in the group are sequentially read from via a same selection and readout circuit 111, 113, which enables to decrease the total number of transistors of the sensor. The described embodiments are however not limited to this specific case. As a variation, each pixel may comprise its own readout and selection circuit 111, 113 directly coupled to node a2 of the pixel as in the example of FIG. 1, transistors 213 being then omitted.

In this example, transistors 202, 204, 206, 208, 211, and 213 are N-channel MOS transistors. In operation, transistors 202, 204, 206, 208, 211, and 213 are tor example controlled in switched mode, for example, via binary signals applied to their respective gates.

An example of operation of the sensor of FIG. 4 during an image acquisition phase will now be described. The control method described hereafter may be implemented by peripheral sensor control and readout circuits, not shown.

An initial state where, in each pixel of the sensor, sampling transistor 107 and reset transistor 109 are in the off (non-conductive) state, to isolate from the rest of the pixel individual capacitive storage element C2, having information representative of the illumination level received by the pixels in the group during a previous integration period stored therein, is considered.

In a first step, the transistors 202, 204, 206, and 208 of all the elementary groups of sensor pixels are turned on, for example, simultaneously, to couple, in each pixel group, the nodes a1 of all the pixels in the group to the shared capacitive storage element CS of the group. The reset transistors 211 of all the elementary groups of sensor pixels are then turned on, for example, simultaneously, to reset the shared capacitive storage element CS of each group to a predetermined voltage level, for example, close to the potential of node VDD.

Reset transistors 211 are then simultaneously turned back off in all the sensor pixels, which marks the beginning of a period of simultaneous integration of all the sensor pixels. More particularly, the time of turning-off of reset transistors 211 marks the beginning of a first sub-period of the sensor integration period, during which, in each elementary group of pixels, the photocurrents generated by photoelectric conversion elements 101, 103 of the different pixels in the group are summed and integrated in the shared capacitive storage element CS of the group.

During a first part of the first integration sub-period, the voltage levels of the capacitive storage elements C2 of the sensor pixels, representative of the illumination levels received during the previous integration period, are successively read, for example, row by row, via transistors 213, 111, 113, and the conductive tracks CL of the sensor.

In each pixel of the sensor, after the reading of the voltage level of capacitive element C2, element C2 is reset to a predetermined voltage, for example close to the potential of node VDD, by the turning on and then back off of transistor 109. This step of resetting capacitive element C2 may be carried out simultaneously for all the sensor pixels, after the reading of the last row of sensor pixels, after the reading of the last row of pixels, or sequentially, as the rows are being read.

After the reading and the resetting of the capacitive storage elements C2 of all the sensor pixels, the sampling transistors 107 are simultaneously turned on in all the sensor pixels. In each elementary group of sensor pixels, the photogenerated charges stored in shared capacitive element CS from the beginning of the integration period are then shared between capacitive element CS and individual capacitive elements C2 of the four pixels in the group. This marks the end of the first part and the beginning of a second part of the first integration sub-period.

During the second part of the first integration sub-period, the sum of the photocurrents generated by the photodiodes of the pixels of each group is integrated not only in the shared capacitive element CS of the group, but also in the individual capacitive elements C2 of the pixels of the group (each of the individual capacitive elements C2 being coupled in parallel with shared capacitive element CS).

Control transistors 202, 204, 206, and 208 are then simultaneously turned off in all the elementary groups of sensor pixels. The turn-off time of transistors 202, 204, 206, and 208 marks the end of the first sub-period of the sensor integration period, and the beginning of a second sub-period of the integration period, enabling to differentiate the luminosity levels received by the different pixels of a same elementary group of pixels of the sensor. During the second integration sub-period, in each pixel of the sensor, the photocurrent generated by the photodiode of the pixel is integrated in the only individual capacitive storage element C2 of the pixel, and no longer in the shared capacitive element CS of the elementary group containing the pixel.

Sampling transistors 107 are then simultaneously turned by off in all the sensor pixels, which marks the end of the second integration sub-period and, more generally, the end of the sensor integration period.

At this stage, in each pixel of the sensor, capacitive storage element C2 stores a voltage level comprising a component representative of the sum of the luminosity levels received by the photodiodes of the four pixels of the elementary group containing the pixel during the first integration sub-period, and a component representative of the luminosity level received by the only photodiode of the pixel during the second integration sub-period.

The method then resumes from the first step to implement a new sensor integration period and to simultaneously read the data stored in capacitive elements C2.

To construct an image representative of the scene from the data read from capacitive elements C2, a processing is applied, which enables to calculate, for each sensor pixel, from the values read from the capacitive elements C2 of the four pixels of the elementary group containing the pixel, a value representative of the illumination level received by the pixel during the full integration period. Such a processing may be implemented by a calculation circuit included in the peripheral control and readout circuits of the sensor, or by a calculation circuit external to the sensor. An example of such a processing will now be described.

T1 designates the duration of the first integration sub-period (ranging from the turn-on time of reset transistors 211 to the turn-off time of transistors 202, 204, 206, and 208) and T2 designates the duration of the second integration sub-period (ranging from the turn-off time of transistors 202, 204, 206, and 208 to the turn-off time of sampling transistors 107). Q1, Q2, Q3, and Q4 further designate the total quantities of charges photogenerated by the photodiodes of pixels P1, P2, P3, and P4 respectively during the full integration period T1+T2. It is further assumed that the light flow received by each pixel of the sensor during the full integration period $T_{int}$=T1+T2 is constant or can be considered as constant.

In each of the pixels Pi of a same elementary group of pixels (i being an integer in the range from 1 to 4 in this example), variation $\Delta ViT1$ of the voltage level of the individual capacitive storage element C2 of the pixel, resulting from the integration of the photocurrents generated by the photodiodes of the four pixels in the group during integration sub-period T1, may be expressed as follows:

$$\Delta Vi_{T1} = \frac{(Q1+Q2+Q3+Q4)}{CS+4*C2} * \frac{T1}{T1+T2}$$

Further, in each of pixel Pi in the group, variation $\Delta Vi_{T2}$ of the voltage level of individual capacitive storage element C2 of the pixel, resulting from the integration of the photocurrent generated by the photodiode of the pixel during integration sub-period T2, can be expressed as follows:

$$\Delta Vi_{T2} = \frac{Q_i}{C2} * \frac{T2}{T1+T2}$$

By defining the following variables, a and b;

$$a = \frac{1}{CS+4*C2} * \frac{T1}{T1+T2}$$

$$b = \frac{1}{C2} * \frac{T2}{T1+T2}$$

and by designating with $\Delta Vi_{T1+T2}=\Delta Vi_{T1}+\Delta Vi_{T2}$ total variation of the voltage level of individual capacitive storage element C2 of pixel Pi resulting from the integration of the photocurrents generated by the pixels of the group during the full integration period T1+T2, read from output conductive track CL of pixel Pi during the pixel readout phase, the following equation system can be obtained:

$$\Delta V1_{T1+T2}=(Q1+Q2+Q3+Q4)*a+Q1*b$$

$$\Delta V2_{T1+T2}=(Q1+Q2+Q3+Q4)*a+Q2*b$$

$$\Delta V3_{T1+T2}=(Q1+Q2+Q3+Q4)*a+Q3*b$$

$$\Delta V4_{T1+T2}=(Q1+Q2+Q3+Q4)*a+Q4*b$$

Such a system may be inverted as follows to determine values Q1, Q2, Q3, and Q4 representative of the illumination levels received by the photodiodes of pixels P1, P2, P3, and P4 respectively, from output values $\Delta V1_{T1+T2}$, $\Delta V2_{T1+T2}$, $\Delta V3_{T1+T2}$ and $\Delta V4_{T1+T2}$ of the pixels:

$$Q1=1/(4ab+b^2)*[(3a+b)*\Delta V1_{T1+T2}-a*(\Delta V2_{T1+T2}+\Delta V3_{T1+T2}+\Delta V4_{T1+T2})]$$

$$Q2=1/(4ab+b^2)*[(3a+b)*\Delta V2_{T1+T2}-a*(\Delta V1_{T1+T2}+\Delta V3_{T1+T2}+\Delta V4_{T1+T2})]$$

$$Q3=1/(4ab+b^2)*[(3a+b)*\Delta V3_{T1+T2}-a*(\Delta V1_{T1+T2}+\Delta V2_{T1+T2}+\Delta V4_{T1+T2})]$$

$$Q4=1/(4ab+b^2)*[(3a+b)*\Delta V4_{T1+T2}-a*(\Delta V1_{T1+T2}+\Delta V2_{T1+T2}+\Delta V3_{T1+T2})]$$

More generally, whatever the number of pixels per elementary group of sensor pixels, the formulas for calculating values Qi which may be determined similarly to what has just been described, and stored in the calculation circuit provided to process output values of the pixel array.

An advantage of the sensor of FIG. 4 is that, since the capacitance of shared storage element CS is greater than four times the capacitance of an individual storage element C1 of the sensor of FIG. 1, it enables, for an identical pitch between pixels, to store a higher quantity of photogenerated charges than the sensor of FIG. 1, which enables to improve the signal-to-noise ratio.

For a given full integration period $T_{int}$=T1+T2, the time of switching between the first integration sub-period T1 and the second integration sub-period T2 (that is, the turn-off time of transistors 202, 204, 206, and 208) may be adjusted according to characteristics of the scene, an image of which is desired to be acquired, for example, according to the average luminosity level received by the sensor.

Figure 7:
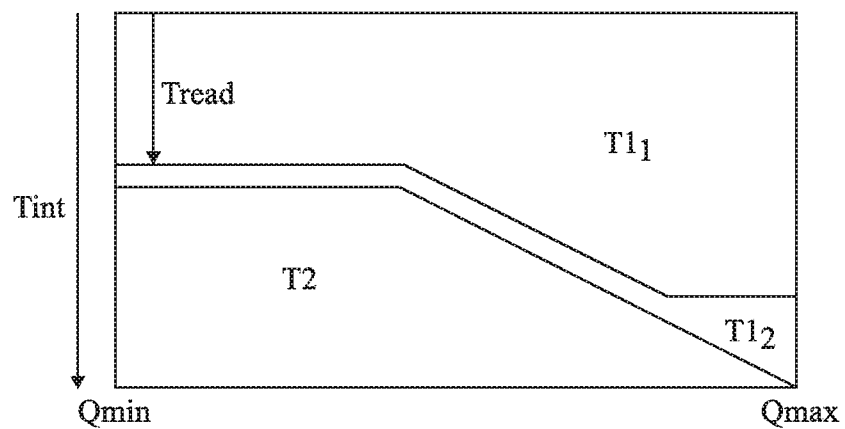
FIG. 7 is a diagram illustrating an example of an operating mode of an image sensor according to an embodiment.
Figure 8:
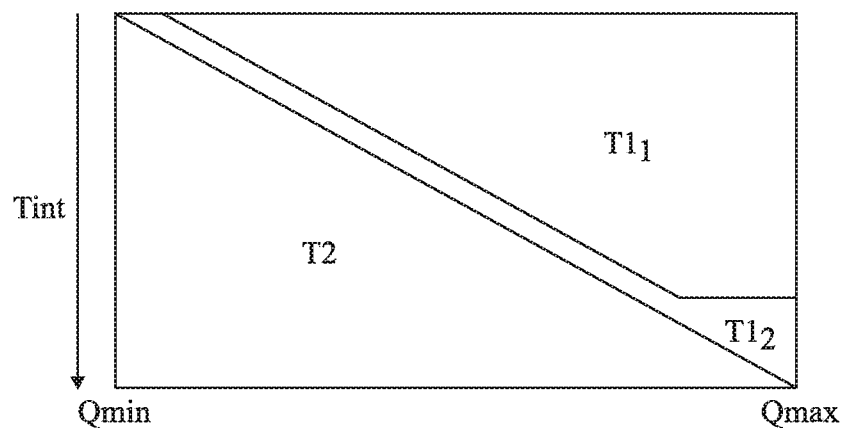
FIG. 8 is a diagram illustrating another example of an operating mode of an image sensor according to an embodiment.

FIGS. 7 and 8 are diagrams showing the variation, according to the quantity of charges photogenerated during the complete integration period $T_{int}$ (in abscissas, from a minimum value Qmin to a maximum value Qmax), of the time ranges (in ordinates) where first part $T1_1$ of first integration sub-period T1, second part $T1_2$ of integration sub-period T1, and integration period T2 can be respectively selected.

As an example, in case of a low luminosity, integration sub-period T1 may be selected to be relatively short and integration sub-period T2 may be selected to be relatively long and, in case of a strong luminosity, integration sub-period T1 may be selected to be relatively long and integration sub-period T1 may be relatively short.

In the case of a IWR-type operation such as described hereabove, and as illustrated by the diagram of FIG. 7, the lower limit for the duration of first part $T1_1$ of first integration sub-period T1 is the minimum duration $T_{read}$ necessary for the reading of the values stored in the capacitive elements C2 of the sensor pixels.

Further, the upper limit for the duration of first, part $T1_1$ of integration sub-period T1 is set by the current of the photodiode corresponding to the maximum targeted photonic flow and by shared capacitive element CS.

The described embodiments are however not limited to sensors having an IWR-type operation. As a variation, the reading of the values stored in elements C2 may be performed between two successive integration periods, in which case there is no lower limit to the duration of first part $T1_1$ of integration sub-period T1. Such an operation is illustrated in the diagram of FIG. 8.

The setting of the switching times between sub-periods $T1_1$ and $T1_2$ and then $T1_2$ and T2 may be generally performed for the entire sensor, or individually in each elementary group of pixels of the sensor. As an example, each elementary group of pixels may comprise a local setting circuit (not shown in the drawings) capable of monitoring the variation of the voltage across capacitive element CS during a setting phase at the beginning of first integration sub-period T1, and of setting the switching time between sub-periods T1 and T2 according to the observed variation of the voltage across element CS during the setting phase. As a variation, the setting of the durations of integration sub-periods T1 and T2 may be performed according to the pixel values acquired during a previous acquisition phase (or frame).

Figure 9:
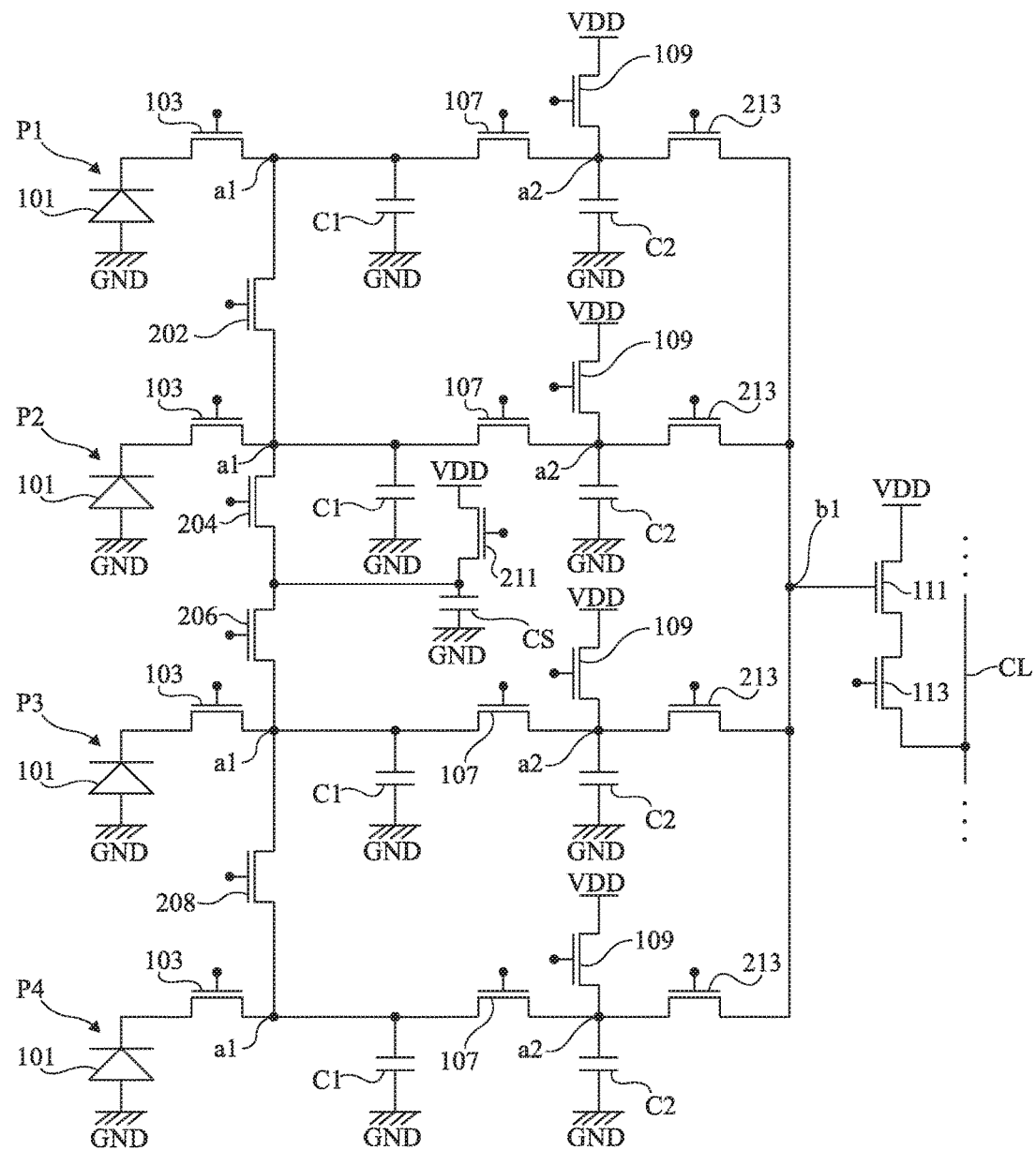
FIG. 9 is a partial electric diagram of a fourth example of an image sensor according to an embodiment.

FIG. 9 is a partial electric diagram of another ex-ample of an image sensor according to an embodiment. The sensor of FIG. 9 comprises elements common with the sensor of FIG. 6. These elements will not be described in detail again. In the rest of the description, only the differences between the sensor of FIG. 6 and the sensor of FIG. 9 will be highlighted.

As in the example of FIG. 6, the sensor of FIG. 9 comprises a plurality of pixels distributed in a plurality of elementary groups (identical or similar) of a plurality of neighboring pixels. Further, as in the example of FIG. 6, only one elementary group of four neighboring pixels P1, P2, P3, P4 of the sensor has been shown in FIG. 9.

The pixels of the sensor of FIG. 9 comprise the same elements as the pixels of the sensor of FIG. 6, arranged substantially in the same way.

In the sensor of FIG. 9, each pixel further comprises, as in the example of FIG. 1, an individual capacitive storage element C1 different from element C2, between node a1 and node GND, and a reset transistor 105 coupling node a1 to node VDD.

The operation of the sensor of FIG. 9 is for example similar to the operation of the sensor of FIG. 6, except relating to the following points.

In the sensor of FIG. 9, during the first step, before the beginning of the first integration sub-period T1, the resetting of shared capacitive storage element CS by simultaneous turning-on of transistors 202, 204, 206, 208, and 211 also results in resetting individual capacitive storage elements C1.

Further, in the sensor of FIG. 9, during first integration sub-period T1, in each elementary group of pixels, the charges photogenerated in the photodiodes of pixels P1, P2, P3, and P4 of the group are distributed between shared capacitive element CS and individual capacitive elements C1 of the different pixels in the group.

The alternative embodiment of FIG. 9 has the advantage of enabling to store in each elementary group of pixels, during the first integration sub-period, a greater quantity of photogenerated charges than in the previous examples.

Of course, the variation of FIG. 9 may be adapted to the embodiments of FIGS. 4 and 5.

As an example, the architecture of FIG. 9 may operate according to an IWR-type operation, and the selection of the durations of integration sub-periods T1 and T2 can then be performed in accordance with the diagram of FIG. 7 or in accordance with, the diagram of FIG. 8.

It should in particular be noted that in the variation of FIG. 9, the sensor may be configured to operate similarly to what has been described in relation with FIG. 1. To achieve this, transistors 202, 204, 206, and 208 may be kept off during the entire duration of the sensor integration period, during which shared capacitive storage element CS is then not used. In this case, the integration period enabling to differentiate the values of the pixels of the group starts from as soon as the beginning of the total integration period (operation of the type illustrated by the diagram of FIG. 8).

Figure 10:
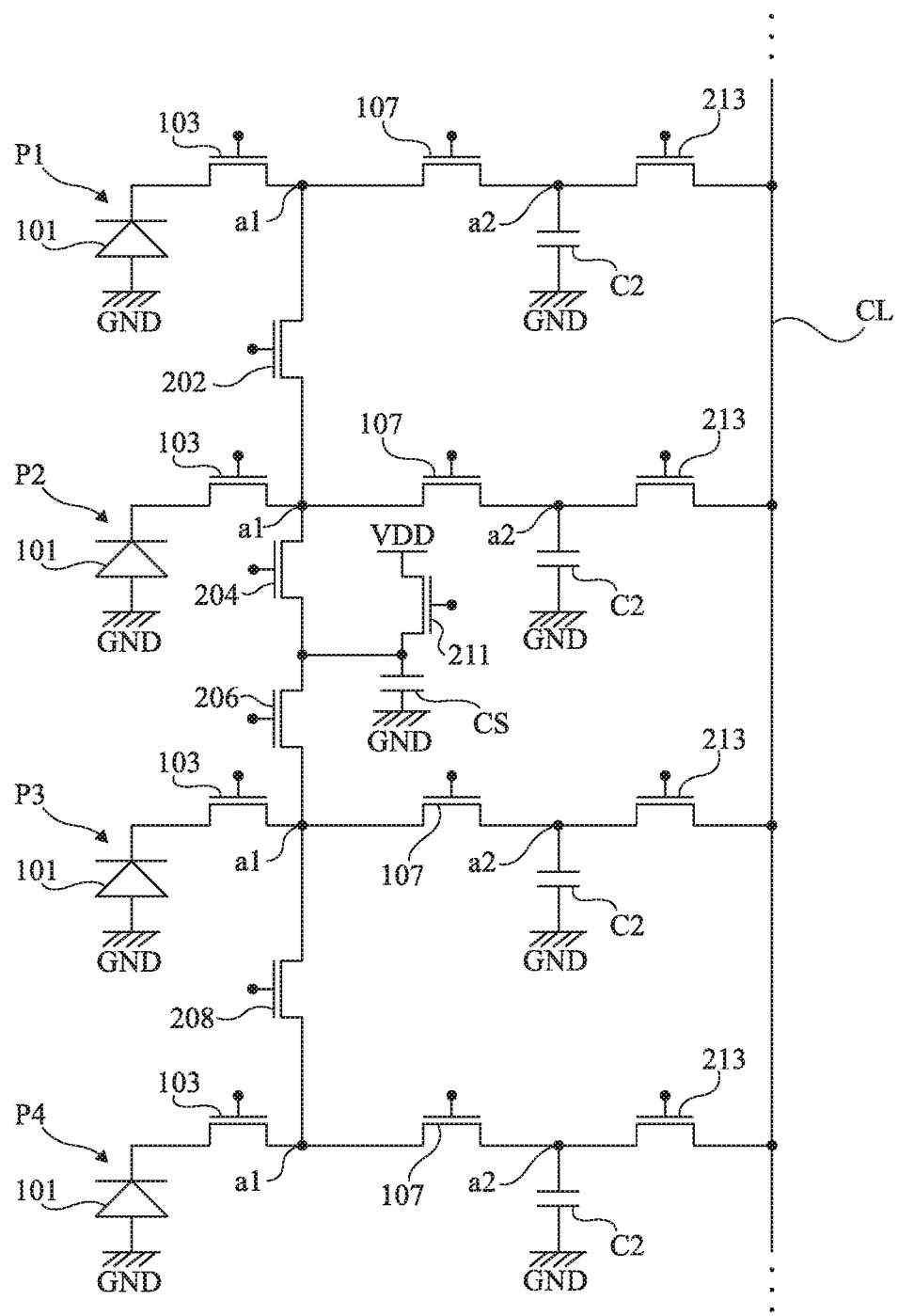
FIG. 10 is a partial electric diagram of a fifth example of an image sensor according to an embodiment.

FIG. 10 is a partial electric diagram of another example of an image sensor according to an embodiment. In this example, the sensor pixels are passive pixels.

The sensor of FIG. 10 comprises elements common with the sensor of FIG. 6. These elements will not be described in detail again. In the rest of the description, only the differences between the sensor of FIG. 6 and the sensor of FIG. 10 will be highlighted.

As in the example of FIG. 6, the sensor of FIG. 10 comprises a plurality of pixels distributed in a plurality of elementary groups (identical or similar) of a plurality of neighboring pixels. Further, as in the example of FIG. 6, only one elementary group of four neighboring pixels P1, P2, P3, P4 of the sensor has been shown in FIG. 10.

The pixels of the sensor of FIG. 10 comprise the same elements as the pixels of the sensor of FIG. 6, arranged substantially in the same way, except for reset, transistors 109, which are omitted in the sensor of FIG. 10.

Further, in the sensor of FIG. 10, readout circuit 111, 113, common to the pixels of a same group is omitted.

In each pixel of the sensor of FIG. 10, the selection transistor 213 of the pixel directly couples, by its conduction nodes, node a2 of the pixel to output conductive track CL.

The operation of the sensor of FIG. 10 is for example similar to the operation of the sensor of FIG. 6, but for the fact that the reading and the resetting of the capacitive element C2 of each pixel is performed similarly to what has been described in relation with FIG. 3.

The variation of FIG. 10 may be adapted to the embodiments of FIGS. 4, 5, and 9.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. An image sensor comprising a plurality of pixels distributed in a plurality of elementary groups of a plurality of pixels each, wherein:
    each pixel comprises a photoelectric conversion element and an individual capacitive storage element; and
    each elementary group of pixels comprises a shared capacitive storage element,
    the sensor further comprising a control circuit capable, during a current image acquisition phase, of implementing, in each elementary group of pixels, the steps of:
    a) during a first integration sub-period, coupling the photoelectric conversion elements of the pixels of the group to the shared capacitive storage element, to integrate a current representative of the sum of the photo-currents generated by the photoelectric conversion elements of the pixels of the group, and coupling the individual capacitive storage elements of the pixels of the group to the shared capacitive storage element to distribute the photogenerated charges between the shared capacitive storage element and the individual capacitive storage elements; and
    b) during a second integration sub-period following the first integration sub-period, in each pixel of the group, isolating the individual capacitive storage element of the pixel from the shared capacitive storage element and coupling the photoelectric conversion element of the pixel to the individual capacitive storage element of the pixel to integrate in the individual capacitive storage element of the pixel a current representative of the photocurrent generated by the photoelectric conversion element of the pixel.

2. The sensor of claim 1, wherein the control circuit is capable, at step a), of implementing the successive steps of:
    a1) during a first part of the first integration sub-period coupling the photoelectric conversion elements of the pixels of the group to the shared capacitive storage element and isolating, in each pixel of the group, the individual capacitive storage element of the pixel from the shared capacitive storage element, to integrate, in the shared capacitive storage element only, a current representative of the sum of the photocurrents generated by the photoelectric conversion elements of the pixels of the group; and
    a2) during a second part of the first integration sub-period, coupling the individual capacitive storage elements of the pixels of the group to the shared capacitive storage element to distribute between the shared capacitive storage element and the individual capacitive storage elements the charges photogenerated by the photoelectric conversion elements of the pixels of the group during the first integration sub-period.

3. The sensor of claim 2, wherein the control circuit is further capable of, in each pixel of the group, during the first part of the first integration sub-period, reading a value representative of the voltage level of the individual capacitive storage element of the pixel, corresponding to an output value of a previous acquisition phase.

4. The sensor of claim 3, wherein the control circuit is further configured to, in each pixel of the group, during the first part of the first integration sub-period and after the reading of the output value of the previous acquisition phase, reset the individual capacitive storage element of the pixel.

5. The sensor of claim 1, wherein the control circuit is capable of, at step a), coupling the individual capacitive storage elements of the pixels of the group to the shared capacitive storage element during the entire first integration sub-period.

6. The sensor of claim 1, wherein the control circuit is further configured to, from each pixel of the group, at the end of the second integration sub-period, read a value representative of the voltage level of the individual capacitive storage element of the pixel, corresponding to an output value of the current acquisition phase.

7. The sensor of claim 6, wherein the control circuit is further configured to read a value representative of the voltage level of the shared capacitive storage element at the end of the first integration sub-period.

8. The sensor of claim 6, further comprising a processing circuit capable of determining, for each pixel of the group, a final output value by taking into account the output values of the current acquisition phase of all the pixels of the group.

9. The sensor of claim 8, wherein the final output value of each pixel is a weighted sum of the output values of the current acquisition phase of all the pixels of the group.

10. The sensor of claim 1, wherein:
    each pixel comprises a photodiode supplying a photocurrent on a first node of the pixel, and a sampling transistor coupling the first node to the individual capacitive storage element of the pixel; and
    each elementary group of pixels comprises a set of control transistors coupling the first node of each pixel of the group to the shared capacitive storage element of the group.

11. The sensor of claim 10, wherein each pixel further comprises an additional individual capacitive storage element connected to the first node.

12. The sensor of claim 2, wherein the control circuit is capable of setting a first time of switching between the first and second parts of the first integration period and a second time of switching between the first and second integration periods according to an average luminosity level received by the sensor.

13. The sensor of claim 12, wherein the setting of the first and second switching times is generally performed for all the elementary groups of pixels of the sensor.

14. The sensor of claim 12, wherein the setting of the first and second switching times is performed individually in each elementary group of pixels of the sensor.

15. The sensor of claim 14, wherein each elementary pixel group comprises a local setting circuit capable of monitoring the variation of the voltage across the shared capacitive storage element during a setting phase at the beginning of the first integration sub-period, and of setting the first and second switching times according to the observed variation of the voltage across the shared capacitive storage element during the setting phase.

16. The sensor of claim 12, wherein the setting of the first and second switching times is performed by taking into account a luminosity level measured during one or a plurality of previous acquisition phases.

* * * * *